US009742722B2

(12) United States Patent
Ticó Farré

(10) Patent No.: US 9,742,722 B2
(45) Date of Patent: Aug. 22, 2017

(54) METHOD, A SYSTEM AND A COMPUTER PROGRAM PRODUCT FOR CERTIFYING THAT A DESTINATION EMAIL SERVER HAS RECEIVED AN EMAIL MESSAGE SENT FROM A SENDER TO AT LEAST ONE DESTINATION ADDRESS

(76) Inventor: Carlos Ticó Farré, Barcelona (ES)

( * ) Notice: Subject to any disclaimer, the term of this patent is extended or adjusted under 35 U.S.C. 154(b) by 353 days.

(21) Appl. No.: 14/372,431

(22) PCT Filed: Jan. 16, 2012

(86) PCT No.: PCT/EP2012/050583
§ 371 (c)(1),
(2), (4) Date: Feb. 9, 2015

(87) PCT Pub. No.: WO2013/107499
PCT Pub. Date: Jul. 25, 2013

(65) Prior Publication Data
US 2015/0172251 A1 Jun. 18, 2015

(51) Int. Cl.
*G06F 15/16* (2006.01)
*H04L 12/58* (2006.01)
(52) U.S. Cl.
CPC ............. *H04L 51/34* (2013.01); *H04L 51/30* (2013.01)
(58) Field of Classification Search
CPC ...... H04L 63/123; H04L 51/08; H04L 9/3247
USPC .................................................. 709/204, 206
See application file for complete search history.

(56) References Cited

U.S. PATENT DOCUMENTS

| 2001/0027523 | A1* | 10/2001 | Wakino ................. H04L 63/123 726/26 |
| 2005/0198511 | A1* | 9/2005 | Tomkow ................. H04L 51/30 713/176 |
| 2008/0278740 | A1* | 11/2008 | Bird ....................... G06Q 10/10 358/1.15 |

FOREIGN PATENT DOCUMENTS

EP          1 476 995 B1     6/2008

OTHER PUBLICATIONS

Written Opinion of the International Searching Authority for International application No. PCT/EP2012/050583 dated Sep. 14, 2012, 9 pages.

* cited by examiner

*Primary Examiner* — Wing F Chan
*Assistant Examiner* — Andrew Woo
(74) *Attorney, Agent, or Firm* — Squire Patton Boggs (US) LLP

(57) ABSTRACT

The invention relates to a method of certifying that an email message sent through a sender email server from a sender to at least one destination address has been received by a destination email server managing the destination address, the method comprising providing a certification email server, which performs: receiving the email message sent through the sender email server; obtaining an electronic fingerprint of the message; obtaining the destination address from the field of the header of the message relating to the destination address of the message; sending the message to the obtained destination address; receiving from the destination email server a confirmation of the acceptance or refusal of the email message; generating a certification file comprising at least the electronic fingerprint of the email message and the confirmation of the acceptance or refusal of the email message from the destination email server.

12 Claims, 3 Drawing Sheets

200 → EMAIL MESSAGE DESCRIPTION DATA
201 → eEvid ID:        1ED9A3366CBB
202 → Date received:   2011-12-27 17:39:15 UTC+1
203 → Sender:          carxxxxx@xxxxx.xxx
204 → Source IP:       {95.2XX.XXX.XXX}
205 → Recipients:      jroxxxxx@xxxxx.xxx
206 → Email subject:   Evidence Test Email Message
207 → Attached files:  Sample_file.zip, Sample_image.jpg

208 → ELECTRONIC FINGERPRINTS (HASH) OBTAINED FROM THE EMAIL

209 → Email message:   eEvid.Body.1ED9A3366CBB.PDF
210 → Fingerprint (Hash): 0b3cb970ae8e887ea70a3ec8f0827ab59967b16c8036ac48e63c9a887a54a451

211 → Attached file:   Sample_file.zip
212 → Fingerprint (Hash): 6da18f1cf07b6d1dd119d8e43cfbe8a8fde72b-ef3c-aad7906e66ea32f311e94

213 → Attached file:   Sample_image.jpg
214 → Fingerprint (Hash): eb67d3fa28123ebb73956abe19a67686a2946154167ddfcbb9c2ae9128326bd9

215 → CONFIRMATION OF DELIVERY TO EACH DESTINATION EMAIL SERVER

216 → Recipients:                      jroxxxxx@xxxxx.xxx
217 → Email accepted at destination:   YES 250 OK BBBBcGe054375c20051000 IP 212.3XX.XXX.XXX
218 → Date delivered:                  2011-12-27 17:39:17 UTC+1
219 → Transmission details:            2011-12-27 17:39:17 -> jroxxxxx@xxxxx.xxx R=dnslookup
                                       T=remote_smtp H=mx1.serxxxxx.xxx
                                       {212.3XX.XXX.XXX} C="250 OK BBBBcGe054375c20051000"

Lorem ipsum dolor sit amet, consectetur adipisicing elit, sed do eiusmod tempor incididunt
ut labore et dolore magna aliqua. Ut enim ad minim veniam, quis nostrud exercitation ullamc
o laboris nisi ut aliquip ex ea commodo consequat. Duis aute irure dolor in reprehenderit i
n voluptate velit esse cillum dolore eu fugiat nulla pariatur. Excepteur sint occaecat cupi
datat non proident, sunt in culpa qui officia deserunt mollit anim id est laborum.

Regards,

CT

Return-path:<carxxxxx@xxxxx.xxx>
Envelope-to:hash@evxxxxx.xxx
Delivery-date:Tue, 27 Dec 2011 17:39:19 +0100
Received:from mta5.adm.serxxxxx.xxx ([210.1XX.XXX.XXX] helo=cb3.smr.serxxxxx.xxx)
        by proc1.serxxxxx.xxx with esmtp (Exim 4.76)
        (envelope-from <carxxxxx@xxxxx.xxx>)
        id 1Pfa3X-0002m5-M1
        for hash@evxxxxx.xxx; Tue, 27 Dec 2011 17:39:19 +0100
Received:from Server_09.serxxxxx.xxx (localhost [227.1XX.XXX.XXX])
        by cb3.smr.serxxxxx.xxx (MTA) with SMTP id 69DFA64047B
        for <hash@evxxxxx.xxx>; Tue, 27 Dec 2011 17:39:19 +0100 (CET)
Received:from (95.2XX.XXX.XXX) by
        serxxxxx.xxx with ESMTP USCSS_Nostromo (Joel 1.9.2q4c_BB3) id:<BBRHbfdfebb13a6FBE3
6CD>;
        Tue, 27 Dec 2011 17:38:43 +0100 (CET)
X-RealSender:carxxxxx@xxxxx.xxx
X-RealIP:95.2XX.XXX.XXX
X-ToDomain:evxxxxx.xxx
x-m-msg:BBRHbfdfebb13a6FBE36CD
From:CT <carxxxxx@xxxxx.xxx>
Content-Type:multipart/mixed; boundary="Mail-_B3443568-6285-49D7-8AF1-979F80E6D151"
Subject:Evidence Test Email Message
Date:Tue, 27 Dec 2011 17:38:43 +0100
Message-Id:<4E3472A1-2776-442A-869A-6A98D9A3F744@xxxxx.xxx>
Mime-Version:1.0 (Apple Message framework v1251.1)
X-Mailer:Apple Mail (2.1251.1)
to:jroxxxxx.xxx
```

FIG.3

METHOD, A SYSTEM AND A COMPUTER PROGRAM PRODUCT FOR CERTIFYING THAT A DESTINATION EMAIL SERVER HAS RECEIVED AN EMAIL MESSAGE SENT FROM A SENDER TO AT LEAST ONE DESTINATION ADDRESS

The present invention relates to a method of certifying that an email message sent through a sender email server from a sender to at least one destination address has been received by a destination email server managing the destination address.

The invention also relates to a system and a computer program product suitable for carrying out such a method.

BACKGROUND ART

Electronic mail (also known as e-mail) is a network service that allows users to send and receive messages and files quickly by electronic communication systems. This name is primarily used to describe the system that provides this service on the Internet through the Simple Mail Transfer Protocol (SMTP), but by extension it can also be applied to similar systems using other technologies. Through email not only text can be sent, but all kinds of digital documents. Its efficiency, convenience and low cost are causing email to take the place of regular mail for many common uses.

It is widely accepted that in 1971 Ray Tomlinson sent to itself the first email in history through ARPANET, the forerunner of today's Internet. Nowadays, millions of people and organizations around the world exchange billions of emails every day. Email is clearly one of the most widespread methods of communication in the world, but will not necessarily be efficient as evidence from a legal perspective.

The emails are normally sent and received in plain text or HTML formats and without signature of any kind; therefore they have the same evidentiary value as any other private document that can be presented as evidence, thus emails may need to be corroborated by other means. If it is wanted a sent email to be constitutive of proof, it is necessary to accredit this email in some way.

Today, there are many online services addressed to overcome this lack through different procedures, but, in spite of their legal strength, most of them share at least one of the following drawbacks: their cost; emails have to be written and/or sent from non-standard email client software; emails may need to be accessed by the recipients from a source different than standard email client software; and recipients are aware that emails and the access to their content are being registered by express desire of senders.

The European application EP1476995B1 discloses a method of transmitting a message from a sender to a destination address. Generally speaking, a server receives a message from a sender and transmits the message through the Internet to a recipient. The server normally transmits the message in a first path through the Internet to the recipient. When the sender indicates at a particular position in the message that the message must be registered, the server transmits the message in a second path through the Internet to the recipient. The sender can also provide additional indications in the message to have the server handle the message in other special ways not normally provided by the server.

It is also described in EP1476995B1 that after learning from the receipt or the recipient's agent through the Internet that the message was successfully received, the server creates and forwards to the sender an electronic receipt. The receipt includes at least one and preferably all: the message and any attachments, a delivery success/failure table listing the receipts, and the receipt times of the message by the recipient's specific agents, and the failure of other agents of the recipient to receive the message and a digital signature of the message and attachments subsequently. By verifying that the digital signature on the sender's receipt matches the digital receipt at the server, the server can verify, without retaining the message, that the receipt is genuine and that the message is accurate.

Thus, the method described in EP1476995B1 seems to keep good evidence over time about the content of a particular email and its delivery to a recipient, without notifying the recipient that the email and the access to its content are being registered. Therefore, this method seems to reduce complexity, cost, indiscretion and other drawbacks previously outlined.

Nevertheless, the method of EP1476995B1 has the drawback of requiring specific adaptations in the email server through which the email message from the sender is transmitted to the destination address. In fact, said email server related to the sender must have implemented the functionalities under which the email is transmitted in a first path or in a second path depending on some indication from the sender. This means that if a sender wants to use the method EP1476995B1 for sending an email, he/she will not be able to do so unless the required functionalities are implemented in his/her email server or his/her email provider's servers. Said "extra" functionalities of redirecting the email may unnecessarily decrease the efficiency of the overall process of sending the email.

Moreover, even in the case of the sender's email server having implemented the functionalities of redirecting the email, there may be scenarios in which said redirection of emails may not be performed. For example, if a user sends an email message from a BlackBerry device through the Research In Motion Ltd. (RIM) email network, the email message is transmitted by the RIM's email servers directly to the recipient's email server. In such scenario the email message is not processed by the sender's "normal" email server. Thus, redirection of the email is not performed and, therefore, any particular indication (requesting e.g. register of the email) provided by the sender is meaningless and incomprehensible to the RIM's email servers and causes no special treatment of the email by RIM's email servers. Consequently, the email will not be registered, as expected by the sender, and the particular indication will not be removed and will remain visible and noticeable to the recipient.

SUMMARY OF THE INVENTION

It is an object of the present invention to provide a method allowing certifying that an email message sent through a sender email server from a sender to at least one destination address has been received by a destination email server managing the destination address.

To achieve the above, according to a first aspect, the invention provides a method of certifying that an email message sent through a sender email server from a sender to at least one destination address has been received by a destination email server managing the destination address, the method comprising:

Providing a certification email server, which performs:
  Receiving the email message sent through the sender email server from the sender to the destination address;

Obtaining an electronic fingerprint of the email message;

Obtaining the destination address from the field of the header of the email message relating to the destination address of the email message;

Sending the email message to the obtained destination address managed by the destination email server;

Receiving from the destination email server a confirmation of the acceptance or refusal of the email message;

Generating a certification file comprising at least the electronic fingerprint of the email message and the confirmation of the acceptance or refusal of the email message from the destination email server.

To achieve this goal, the email message to be certified and generated by the sender may comprise, in the field relating to the destination address, a string comprising a first sub-string concatenated with a second sub-string, the first sub-string representing the real destination address of the email message and the second sub-string representing a wildcard domain name whose Mail Exchange (MX) records point to the IP address of the certification email server whereby the email message will be sent to the certification email server. It is important to highlight that a period is required between the two sub-strings (that is, a period preceding the wildcard domain name) for the wildcard domain name to take effect and act as the primary domain name of the destination email address.

Thus, if the sender wants the email message to be certified he/she must only introduce in the field relating to the destination address the string comprising the two concatenated sub-strings (with the period preceding the wildcard domain name). In any case, the email message generated by the sender is a standard email message that can be treated normally by any email server.

For example, the field of the header relating to the destination address may contain the following string: "recipient@destination.com.eevid.com", which is the result of concatenating a first sub-string "recipient@destination.com" (real destination address) and a second sub-string "eevid.com" (additional domain name—the wildcard domain name) preceded by a period. As can be seen, the obtained destination address is an address that can be managed by any email server.

This way, it is not required specific adaptations in the sender email server through which the email message from the sender is transmitted to the destination address for certifying that the email message has been received by the destination email server managing the destination address. The sender can use any email server, for example, his/her own email server.

According to another embodiment of the present invention, the method may comprise storing in a repository data relating to the obtained electronic fingerprint of the email message and the received confirmation of the acceptance or refusal of the email message from the destination email server.

Furthermore, the method according to the invention may comprise:

Storing in the repository data relating to at least one of the following parameters:
  The Internet Protocol (IP) address of the sender email server;
  The host name of the sender email server from which the email message is received;
  The sender email address obtained from the header of the email message;
  The subject of the email message obtained from the header of the email message;
  The obtained destination address;
  A unique identifier of the certification event;
  The date and time in which the email message is received by the certification email server;
  The date and time in which the confirmation of acceptance or refusal of the email message from the destination email server is received by the certification email server.

With reference to the unique identifier of the certification event, the certification email server may generate said unique identifier to be used as an internal reference of the certification event associated with that particular email message and for whatever data generated from it and from its delivery. Said unique identifier of the certification event may have the form of an alphanumeric string and may be stored in a repository of certification data (e.g. the same repository previously described). If the repository is a relational database, the unique identifier may be the primary key of the database.

According to another embodiment, generating the certification file may comprise:

Obtaining data stored in the repository relating to at least the obtained electronic fingerprint of the email message and the received confirmation of the acceptance or refusal of the email message from the destination email server;

Generating a portable document format (PDF) file from the obtained data.

Also, the method may comprise storing in the repository the communication between the certification email server and the destination email server including the confirmation of the acceptance or refusal of the email message from the destination email server; and wherein the generated certification file may comprise the stored communication.

On the other hand, obtaining the electronic fingerprint of the email message may comprise:

Generating a portable document format (PDF) file from the email message;

Obtaining the electronic fingerprint of the PDF file.

Said electronic fingerprint of the email message may comprise a cryptographic hash value which may be obtained by applying a cryptographic hash function to a consistent version of the email message. The expression "consistent version" refers to a format of the email message that always produces the same hash value when applying the same cryptographic hash function. For example, when an original email is resent as a file attached to another email, the application of the cryptographic hash function to the original email message and to the attached email may generate different hash values. Thus, it may be understood that email format may generate "inconsistent versions" of an email message.

A cryptographic hash function is a deterministic procedure that takes an arbitrary block of data and returns a fixed-size bit string, the (cryptographic) hash value, such that an accidental or intentional change to the data will change the hash value. The data to be encoded (i.e. inputted to the hash function) is often called the "message" and the hash value (i.e. the output of the hash function applied to the "message") is normally called message digest or simply digest.

A "consistent version" of the email message may be obtained e.g. by generating a PDF file from the email message. Portable Document Format (PDF) is an open standard for document exchange. This file format, created by Adobe Systems in 1993, is used for representing documents in a manner independent of application software, hardware, and operating systems. Therefore, different executions of the same cryptographic hash function on a PDF representing the same email message are supposed to produce the same hash value. This PDF file obtained from the email message may be stored in a repository, such as e.g. the repository of certification data cited above.

Therefore, obtaining the fingerprint of the email message may comprise applying a cryptographic hash function to a PDF file generated from the email message. This PDF file may be obtained by e.g. printing the email message to a PDF virtual printer. This fingerprint of the PDF containing the email message (e.g. hash value) and related data may be stored in a repository, such as e.g. the repository of certification data.

According to another preferred embodiment, the email message may comprise at least one attached file and the method may comprise:

Obtaining an electronic fingerprint of the attached file; and wherein the generated certification file may comprise the electronic fingerprint of the attached file.

Said fingerprint of each attached file is generated by applying a cryptographic hash function to the attached file. These fingerprints of attached files (e.g. hash values) and related data may be stored in a repository, such as e.g. the repository of certification data.

A hash function that may be used is the SHA-256 which belongs to the standard SHA-2 cryptographic hash functions set, although another hash function may be used if e.g. it is demonstrated in the future that SHA-256 is not secure enough. For example, SHA-1 and MD5 where initially considered in the context of this invention, but they were finally discarded due to some reported security flaws. The security of a hash function is determined by its resistance to collisions. A hash function is collision resistant if its application to different messages (data to be encoded) produces different message digest. Even though SHA-256 is currently used in the context of this invention, it could be substituted in the future by another hash function with improved resistance to collisions (i.e. more secure), such as e.g. SHA-3, which is a new hash standard currently under development at the time of this patent application.

Preferably, the method may comprise digitally signing the generated certification file. Additionally, the method may comprise timestamping the generated digitally signed certification file.

The digital signature may be considered a good way to guarantee the integrity of the content of the certification file. This digital signature and related data may be stored in a repository, such as e.g. the repository of certification data.

Further, the digital signature may include a timestamp token that will undoubtedly establish the precise date and time at which the certification file was digitally signed. This timestamp may be provided by an RFC 3161 compliant independent Time Stamping Authority (TSA). This timestamp token and related data may be stored in a repository, such as e.g. the repository of certification data.

According to the RFC 3161 standard, a trusted timestamp is a timestamp issued by a trusted third party (TTP) acting as a Time Stamping Authority (TSA). It is used to prove the existence of certain data before a certain point (e.g. contracts, research data, medical records, etc.) whilst preventing anyone from backdating the timestamps. Multiple TSAs can be used to increase reliability and reduce vulnerability.

Due to the fact that digital signatures are based on cryptographic algorithms that can be broken in the future, the digital signature of a digitally signed file will be considered valid for a limited period of time, after which the signature will expire. This period of time is normally of a few years. In order to keep the digital signature of the certification file in force, some embodiments of the method may comprise periodically digitally signing over the certification file and adding a timestamp to the new digital signature. This periodic signature and time-stamp may be generated e.g. a reasonably short time before the expiration of the current signature and related time-stamp.

Consequently, by signing the generated certification file and timestamping the generated digitally signed certification file it is possible to prove the content of the email message, the acceptance or refusal of the email message from the destination email server in a reliable way and when the whole event took place.

The method may comprise sending the generated certification file to the sender through the sender email server.

Alternatively, the method may comprise sending the generated certification file to the destination address through the destination email server.

According to a second aspect, the invention provides a certification email server for certifying that an email message sent through a sender email server from a sender to at least one destination address has been received by a destination email server managing the destination address, the certification email server comprising a memory and a processor, embodying instructions stored in the memory and executable by the processor, the instructions comprising functionality to:

Receiving the email message sent through the sender email server from the sender to the destination address;
Obtaining an electronic fingerprint of the email message;
Obtaining the destination address from the field of the header of the email message relating to the destination address of the email message;
Sending the email message to the obtained destination address managed by the destination email server;
Receiving from the destination email server a confirmation of the acceptance or refusal of the email message;
Generating a certification file comprising at least the electronic fingerprint of the email message and the confirmation of the acceptance or refusal of the email message from the destination email server.

According to a third aspect of the invention, it is provided a computer system for certifying that an email message sent through a sender email server from a sender to at least one destination address has been received by a destination email server managing the destination address, the computer system comprising computer means for receiving the email message sent through the sender email server from the sender to the destination address; computer means for obtaining an electronic fingerprint of the email message; computer means for obtaining the destination address from the field of the header of the email message relating to the destination address of the email message; computer means for sending the email message to the obtained destination address managed by the destination email server; computer means for receiving from the destination email server a confirmation of the acceptance or refusal of the email message; computer means for applying cryptographic hash functions to digital files; computer means for generating a certification file comprising at least the electronic fingerprint of the email message and the confirmation of the acceptance or refusal of the email message from the destination email server.

In another aspect of the present invention, it is provided a computer program product comprising program instructions for causing a computer to perform the method of certifying that an email message sent through a sender email server from a sender to at least one destination address has been received by a destination email server managing the destination address. The invention also relates to such a computer program product embodied on a storage medium (for example, a CD-ROM, a DVD, a USB drive, on a computer memory or on a read-only memory) or carried on a carrier signal (for example, on an electrical or optical carrier signal).

Throughout the description and claims the word "comprise" and variations of the word, are not intended to exclude other technical features, additives, components, or steps. Additional objects, advantages and features of the invention will become apparent to those skilled in the art upon examination of the description or may be learned by practice of the invention. The following examples and drawings are provided by way of illustration, and they are not intended to be limiting of the present invention. Reference signs related to drawings and placed in parentheses in a claim, are solely for attempting to increase the intelligibility of the claim, and shall not be construed as limiting the scope of the claim. Furthermore, the present invention covers all possible combinations of particular and preferred embodiments described herein.

DEFINITIONS

In order to avoid confusions and facilitate understanding of descriptions related to the present invention, this section provides numerous and detailed definitions of key concepts in the context of the present invention.

In the field of the invention, the term "electronic mail" (commonly known as email or e-mail) usually refers to a method of exchanging digital messages from a sender to one or more recipients, mainly across the Internet or other computer networks.

An email message consists of three components: the message envelope, the message header, and the message body.

The "message envelope" contains the delivery parameters communicated by SMTP in the process of transporting email messages between systems. Throughout this patent application, SMTP standard, SMTP transmission, SMTP data, confirmation of acceptance and confirmation of delivery, all refer to the message envelope. For other purposes, email message will only refer to the message header and the message body.

The "message header" contains control information, including, minimally, a sender's email address and one or more recipient addresses. Usually descriptive information is also added, such as and not limited to a subject header field, IP addresses of any system through which the email has been transported or the local date and time when the message was sent. Each email message has exactly one header, which is structured into fields. Each field has a name and a value. RFC 5322 specifies the precise syntax of message headers.

As for this patent application, the "message body" specifically refers to what will actually be printed out when an email message is printed from any email client software. This excludes the message header and any file eventually attached to the email message.

The term "certification" refers to the ability to prove that a particular email message, including its contents and digital files eventually attached, was actually delivered to a particular recipient and when that delivery took place.

The term "certification file" refers to a PDF file (or any other appropriate or equivalent format) that collects information from a particular email message, this is from its envelope, header and body, the names of all digital files eventually attached to that email message or of all digital files related or generated as part of the method in regards to the certification of that particular message, and the hash value of any of these digital files.

For legal purposes and as detailed throughout this patent application, this PDF certification file is ultimately digitally signed and timestamped so as to grant the integrity of the data contained on it, reliably set the date when it was created and, finally, enabling to compare the information contained on it with the original data from which this information was obtained and prove the integrity of this original data.

The term "electronic fingerprint" refers to the hash value, also known as the message digest or simply digest, that by the means of a cryptographic hash function is obtained from a block of data, also known as the message. As for this patent application, the block of data can be an email message, a digital file eventually attached to the email message or any digital file related or generated as part of the method in regards to a particular certification event.

The term "unique identifier" refers to an identification key in the form of an alphanumeric string that identifies a particular event exclusively, namely a certification event as it results from applying the method, and that for this reason needs to be unique and different from any other identifier. As for this patent application, the unique identifier comprehends not just the event, but also any data and files obtained or generated from that particular event.

Finally, the term "email server" refers to software that transfers electronic mail messages from one computer system to another using a client—server application architecture, namely a Message Transfer Agent or Mail Transfer Agent (MTA). An MTA implements both the client (sending) and server (receiving) portions of the Simple Mail Transfer Protocol (SMTP), thus it is capable of both sending and receiving email messages. It also refers to electronic devices (e.g. computers or mobile terminals—smartphones, tablets, etc.) performing the MTA function.

BRIEF DESCRIPTION OF THE DRAWINGS

Particular embodiments of the present invention will be described in the following by way of non-limiting examples, with reference to the appended drawings, in which:

FIG. 2 shows the content of a PDF file comprising data evidencing that an email message has been accepted at destination, according to embodiments of the invention; and FIG. 3 shows the content of PDF file comprising data representing the body and the header of the email message referred by FIG. 2, according to embodiments of the invention.

DETAILED DESCRIPTION OF EMBODIMENTS OF THE INVENTION

Figure 1:
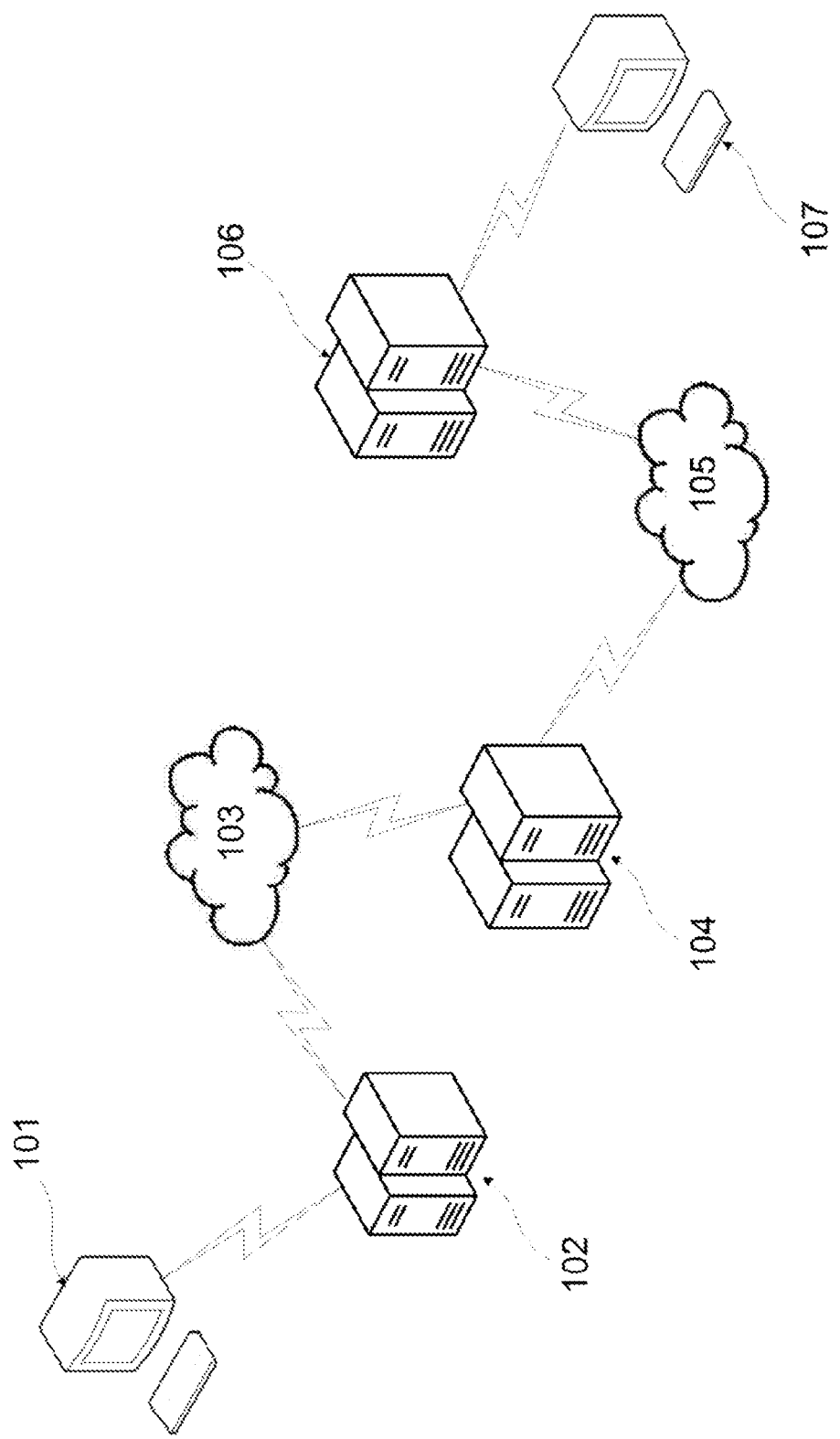
FIG. 1 is a schematic representation of a configuration of systems that comprises a certification email server according to embodiments of the invention.

In the following descriptions, numerous specific details are set forth in order to provide a thorough understanding of the present invention. It will be understood by one skilled in the art, however, that the present invention may be practiced without some or all of these specific details. In other instances, well known elements have not been described in detail in order not to unnecessarily obscure the description of the present invention.

FIG. 1 schematically represents an overall configuration of systems that is suitable to carry out embodiments of the method of the invention. In particular, an email message can be sent from a sender 101 through a sender email server 102 to one or more destination addresses indicated in the header of the email message. Each of said destination addresses can be managed by a separate destination email server 106 and may represent at least one recipient 107 of the email message. FIG. 1 only shows one recipient 107 and one related destination email server 106 for reasons of simplicity, but it has to be understood that embodiments of the method may support several destination addresses referring to several recipients managed by several destination email servers.

The sender email server 102 and the destination email server 106 are connected through at least one communications network 103,105, such as for example Internet. FIG. 1 shows a first network 103 and a second network 105, but said two networks 103,105 may be the same communications network.

A "normal" email message from the sender 101 will generally comprise, in the field of the header relating to the destination address, the destination address for the recipient 107. For example, the field relating to the destination address may comprise "recipient@destination.com" as the destination address representing the recipient 107. Following the standard protocol for Simple Mail Transfer Protocol (SMTP) email transmission, the sender email server 102 will connect with the destination email server 106 by resolving the mail exchange record (MX) for the "destination.com" domain name, in order to transmit the email.

A mail exchange record (MX record) is a type of resource record in the Domain Name System (DNS) that specifies the IP address of a mail server responsible for accepting email messages addressed to a given domain name, and a preference value used to prioritize mail delivery if multiple mail servers (actually, MX records) are specified. The set of MX records of a domain name specifies how email should be routed according to the SMTP standard.

The Domain Name System (DNS) is a hierarchical distributed naming system for computers, services, or any resource connected to the Internet or a private network. DNS associates different information with domain names assigned to each of the participating entities. Most importantly, DNS translates domain names meaningful to humans into numerical identifiers associated with networking equipment for the purpose of locating and addressing these devices worldwide.

In the context of the present invention, the email message (to be certified) from the sender 101 may comprise, in the field relating to the destination address, the result of concatenating a first sub-string representing the ultimate and real destination address representing the recipient 107 and a second sub-string representing an additional domain name (preceded by a period). The DNS records of this additional domain name may have been configured to accept wildcards for the MX records of that additional domain name and always return the same route to the certification email server 104 regardless of what the wildcard contains. For example, the field of the header relating to the destination address may contain the following string: "recipient@destination.com.eevid.com", which is the result of concatenating a first string "recipient@destination.com" (real destination address) and a second sub-string "eevid.com" (additional domain name) preceded by a period.

As defined by the 1987's RFC 1034, "Domain names—Concepts and facilities", and clarified in 2006 in RFC 4592, "The Role of Wildcards in the Domain Name System", wildcard records will give the ability to map all (or a section) of the records of a given domain name to one IP. A wildcard DNS record is specified by using a "*" as the left most label (part) of a domain name, e.g. "*.eevid.com".

It is important to take into account that a routing response from a wildcard DNS based MX record is indistinguishable from that of a non-wildcard DNS based MX record; no matter whether a domain name's MX records are based on a wildcard DNS configuration or not, an email server trying to deliver an email message to that particular domain name will behave exactly the same way.

Therefore, the sender email server 102 normally sends the email message to this certification email server 104 in accordance with the domain name's MX records which are pointing to the certification email server 104. Once the certification email server 104 has received the email message, this certification email server 104 may be ready to generate a certification file related to the email message.

The method may comprise validating the email address of the sender 101, and verifying that said email address corresponds to a registered sender 101. If the email address of the sender 101 is registered, the certification email server 104 may undertake generation of the certification file. If the email address of the sender 101 is not registered, the certification request from the sender 101 may be refused and, thus, e.g. the certification file not generated.

The certification email server 104 may generate a unique identifier to be used as an internal reference of the certification event associated with that particular email message and for whatever data generated from it and from its delivery by the means of embodiments of the certification method. Said unique identifier of the certification event may have the form of an alphanumeric string and may be stored in a repository of certification data.

Then, the certification email server 104 may extract data from the email message header that may be relevant in regards to the email message, such as e.g. the IP address where it came from, the email address of the sender 101, the destination addresses of the intended recipients 107, the subject of the email message, etc. For instance, the certification email server 104 may obtain the real destination address (e.g., according to the previously proposed example: "recipient@destination.com") from the header field referring to the destination address of the email message. The real destination address may be obtained e.g. by detecting and subsequently removing from the message header the string ".eevid.com", which corresponds to the additional domain name that points to the certification email server 104. This data extracted from the email header may be stored in a repository, such as e.g. the repository of certification data.

Once the certification email server 104 has obtained the destination address, the certification email server 104 may start the delivery of the email message to the destination address 107 by normally resolving the MX records for the "destination.com" domain name, which will route the email message to the destination email server 106. Once a valid MX record is retrieved, i.e. a valid IP address, the email server 104 may assume that an email server 106 behind that IP address will accept or refuse email messages for the "destination.com" domain name and, consequently, the certification email server 104 may attempt delivery of the email message by initiating an SMTP transmission with the destination email server 106. When successful and during said SMTP transmission, the certification email server 104 may receive from the destination email server 106 a confirmation of the acceptance or refusal of the email message in the form of e.g. a "250 OK" code, following the SMTP recommendations. This confirmation of acceptance or refusal may be stored in a repository, such as e.g. the repository of certification data.

The destination email server 106 may provide e.g. data relative to the email message, its recipient or the acceptance/refusal of the email message including, but not limited to a destination's identifier of the email message generally representing a unique and internal identifier, by which the destination email server 106 has registered both the email message and all the events and facts related to its transmission. This data provided by the destination email server 106 may be stored in a repository, such as e.g. the repository of certification data.

The certification email server 104 may generate a record comprising data representing at least the confirmation of the acceptance/refusal of the email message and other related data, such as e.g. the destination's identifier of the email message. After that, the certification email server 104 may send the record to the sender 101 through the sender email server 102. This record of data may be obtained e.g. from the repository of certification data. Alternatively or in addition to sending the record to the sender 101, the certification email server 104 may send the record to the destination address through the destination email server 106.

Alternatively or in addition to sending the record to the sender 101, the certification may not send the record to the sender 101 but to a destination address related to the sender 101. For example, for a plurality of senders 101 belonging to a same company, the record may be sent to a single destination address of the company instead of sending the record to each sender 101 of the company.

In some embodiments, the certification email server 104 may store in a repository (such as e.g. the repository of certification data) data representing the communication between the sender email server 102 and the certification email server 104 and between the certification email server 104 and the destination email server 106. Said data may include e.g. the IP addresses for each email server, and/or the hostname of each mail server, and/or the confirmation of acceptance/refusal of the email message by the destination email server 106, etc. Said record of data may further comprise data representing the communication between the certification email server 104 and the destination email server 106.

In embodiments of the invention, the method may comprise obtaining a fingerprint of the email message, which may be stored in a repository, such as e.g. the repository of certification data.

The fingerprint of the email message may comprise a hash value representing the email message. This hash value may be obtained by applying a cryptographic hash function to a consistent version of the email message. The expression "consistent version" refers to a format of the email message that always produces the same hash value when applying the same cryptographic hash function. For example, when an original email is resent as a file attached to another email, the application of the cryptographic hash function to the original email message and to the attached email may generate different hash values. Thus, it may be understood that email format may generate "inconsistent versions" of the email message.

A cryptographic hash function is a deterministic procedure that takes an arbitrary block of data and returns a fixed-size bit string, the (cryptographic) hash value, such that an accidental or intentional change to the data will change the hash value. The data to be encoded (i.e. inputted to the hash function) is often called the "message" and the hash value (i.e. the output of the hash function applied to the "message") is normally called message digest or simply digest.

A "consistent version" of the email message may be obtained e.g. by generating a PDF file from the email message. Portable Document Format (PDF) is an open standard for document exchange. This file format, created by Adobe Systems in 1993, is used for representing documents in a manner independent of application software, hardware, and operating systems. Therefore, different executions of the same cryptographic hash function on a PDF representing the same email message are supposed to produce the same hash value. This PDF file obtained from the email message may be stored in a repository, such as e.g. the repository of certification data.

Therefore, obtaining the fingerprint of the email message may comprise applying a cryptographic hash function to a PDF file generated from the email message. This PDF file may be obtained by e.g. printing the email message to a PDF virtual printer. This fingerprint of the email message (e.g. hash value) and related data may be stored in a repository, such as e.g. the repository of certification data.

In preferred embodiments, when the email message comprises at least one attached file, the method may further comprise obtaining a fingerprint of each attached file. Said fingerprint of each attached file generated by applying a cryptographic hash function to the attached file. These fingerprints of attached files (e.g. hash values) and related data may be stored in a repository, such as e.g. the repository of certification data.

A hash function that may be used is the SHA-256 which belongs to the standard SHA-2 cryptographic hash functions set, although another hash function may be used if e.g. it is demonstrated in the future that SHA-256 is not secure enough. For example, SHA-1 and MD5 where initially considered in the context of this invention, but they were finally discarded due to some reported security flaws. The security of a hash function is determined by its resistance to collisions. A hash function is collision resistant if its application to different messages (data to be encoded) produces different message digest. Even though SHA-256 is currently used in the context of this invention, it could be substituted in the future by another hash function with improved resistance to collisions (i.e. more secure), such as e.g. SHA-3, which is a new hash standard currently under development at the time of this patent application.

In embodiments of the method, the certification email server 104 may generate a certification file comprising at least the fingerprint of the email message and the confirmation of acceptance or refusal of the email message from the destination email server. This certification file may further comprise other data related to the email message, its contents and its delivery to the email server 106; this other data may comprise e.g. the unique identifier of the certification event, and/or relevant data extracted from the email message header, and/or the file name of each of the files attached to the email message, and/or the PDF file name of the consistent version of the email message, and/or the hash values obtained from each file related to the email message and/or attached files, and/or the host name of the sender email server from which the email message is received, and/or the SMTP data recorded upon delivery of the email message to the email server 106. All the data included in the certification file may be obtained from a repository in which said data may have been stored, such as e.g. the repository of certification data. This certification file may be e.g. a PDF file.

In embodiments of the method, the certification email server 104 may digitally sign the certification file. Said digital signature may be considered a good way to guarantee the integrity of the content of the certification file. This digital signature and related data may be stored in a repository, such as e.g. the repository of certification data.

In some embodiments, the digital signature may include a timestamp token that will undoubtedly establish the precise date at which the certification file was digitally signed. This timestamp may be provided by an RFC 3161 compliant independent Time Stamping Authority (TSA). This timestamp token and related data may be stored in a repository, such as e.g. the repository of certification data.

According to the RFC 3161 standard, a trusted timestamp is a timestamp issued by a trusted third party (TTP) acting as a Time Stamping Authority (TSA). It is used to prove the existence of certain data before a certain point (e.g. contracts, research data, medical records, etc.) without the possibility that the owner can backdate the timestamps. Multiple TSAs can be used to increase reliability and reduce vulnerability.

Due to the fact that digital signatures are based on cryptographic algorithms that can be broken in the future, the digital signature of a digitally signed file will be considered valid for a limited period of time, after which the signature will expire. This period of time is normally of a few years. In order to keep the digitally signature of the certification file in force, some embodiments of the method may comprise periodically digitally signing the certification file and time-stamping the digital signature. This periodic signature and time-stamp may be generated e.g. a reasonably short time before the expiration of the current signature and related time-stamp.

In embodiments of the method, the digital signature of the certification file may be generated by applying PAdES (PDF Advanced Electronic Signatures). While PDF and ISO 32000-1 provide a framework for digitally signing their documents, PAdES specifies precise profiles for use with advanced electronic signature in the meaning of European Union Directive 1999/93/EC. One important benefit from PAdES is that electronically signed documents can remain valid for long periods of time, even if the underlying cryptographic algorithms are broken. PAdES recognizes that digitally signed documents may be used or archived for many years, even many decades. In some embodiments, in spite of technological and other advances, it must be possible to validate at any time the certification file to confirm that its related digital signature was valid at the time it was signed, said concept being known as Long-Term Validation (LTV).

The cryptographic principles commented in previous descriptions allow ensuring that the validity of the proof or evidence of the digitally signed and time-stamped certification file may be for very long periods of time.

In some embodiments of the method, the certification email server 104 may provide certification (or proof or evidence) of the email message by delivering to the sender 101 (and/or to a destination address related to the sender 101) a copy of at least the certification file. The PDF file of the email message may also be delivered to the sender 101 (and/or to a destination address related to the sender 101) as part of the certification of the email message. This provision of certification to the sender 101 may be named as certification of sent emails.

Alternatively or in addition to delivering to the sender 101 (and/or to a destination address related to the sender 101) a copy of at least the certification file, the certification email server 104 may send to the destination address a copy of at least the certification file. The PDF file of the email message may also be delivered to the destination address as part of the certification of the email. This provision of certification to the destination address may be named as certification of received emails.

According to embodiments of the invention, a same sender 101 may send a plurality of emails to different recipients 107, in which case the certification email server 104 may generate and store for each of said emails the corresponding data about the email and its certification (as described before with reference to different embodiments). All this data about each email may not comprise the signature and the timestamp of the signature, in which case the certification email server 104 may periodically generate certification data (certification files and so on) about all the emails sent by the same sender 101. For example, the certification email server 104 may concatenate all the certification files of the emails sent by the sender 101 during a reasonable time frame, e.g. 24 hours, and generate a single certification file comprising the content of all the individual certification files. Thus, the certification email server 104 may digitally sign said single certification file and include a timestamp of the signature. This certification of multiple emails makes the certification process cheaper, since only one signature and related timestamp are applied for the multiplicity of emails.

In the embodiments of the method previously described, the different steps taking part in the certification of the email may be performed in any order taking into account the possible dependences between them. For example, obtaining a fingerprint of the email message may be executed either before or after obtaining the destination address from the email message. This is possible because obtaining the fingerprint does not produce any data or event required by obtaining the destination address and, equivalently, obtaining the destination address does not produce any data or event required by obtaining the fingerprint. That is to say, obtaining the fingerprint and obtaining the destination address may be executed in any order with respect each other, because there is no dependency between them.

On the other hand, for example, obtaining the fingerprint must be executed before generating a certification file comprising at least the fingerprint of the email, since this second step requires data (the fingerprint) which is generated by the first step. That is to say, it can be understood that the step of generating the certification file is dependent of the step of obtaining the fingerprint, so they cannot be executed in any order.

The embodiments described with reference to FIG. 1 have the advantage of providing the sender 101 with evidence of that the destination email server 106 has received the email message, without any notification to the recipient 107 regarding such provision of evidence to the sender 101 (and/or to a destination address related to the sender 101). That is to say, the recipient 107 does not participate in the process of providing evidence to the sender 101, and the recipient 107 is never aware of such provision of evidence.

Another advantage is that the sender email server 102 and the destination email server 106 may be conventional email servers, i.e. not requiring particular functionalities to e.g.

redirect the email message depending on an indication from the sender 101. The certification email server 104 is the only agent (of the three required servers 102, 104, 106) concentrating the necessary particular features to carry out the previously described embodiments of the method, in a transparent way with respect to existing sender email server 102 and destination email server 106.

FIG. 2 shows the content of a PDF file comprising data evidencing a sent email message, according to embodiments of the invention. This PDF file may have been generated in a context very similar to the one described in FIG. 1. Therefore, some references to FIG. 1 will be made in the following description of the PDF file depicted by FIG. 2. Some of the data shown in FIG. 2 has been masked for privacy reasons and because said masked data (real email addresses, real host names and real IP addresses) is completely unnecessary to understand the disclosed embodiments of the certification method.

FIG. 2 shows a first section 200 comprising email message description data, as e.g. a unique identifier of the certification event 201, date 202 in which the email has been received at the certification email server 104, email address 203 of the sender 101, source IP 204, email addresses 205 of the recipients 107, subject of the email 206, names of the files attached to the email 207.

FIG. 2 further shows a second section 208 comprising data about attached files and electronic fingerprints related to the email message, as e.g. the name of a PDF file containing the email message 209, a hash value obtained from the PDF file containing the email message 210, the name of each file attached to the email message 211,213, and hash values 212,214 obtained from each file attached to the email message.

FIG. 2 also shows a third section 215 comprising data about the confirmation of delivery to destination email server, as e.g. the email address of each recipient 216, details about the acceptance/refusal of the email at destination 217, date of delivery of the email 218, and transmission details 219.

FIG. 3 shows the content of the PDF file containing the email message, the name of which is included in the FIG. 2 and indicated by the reference 209. No detailed explanations about FIG. 3 are provided because its content is supposed to be very well understood by anyone skilled in the art.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described before, but should be determined only by a fair reading of the claims that follow.

Further, although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier may be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal, which may be conveyed via electrical or optical cable or by radio or other means.

When the program is embodied in a signal that may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. A method of certifying that an email message sent through a sender email server from a sender to at least one destination address has been received by a destination email server managing the at least one destination address, the method comprising:
   providing a certification email server, which performs:
      receiving the email message sent through the sender email server from the sender to the at least one destination address wherein the email message comprises a header and a message body, wherein the email message comprises, in a field of the header of the email message relating to the at least one destination address, a string comprising a first sub-string concatenated with a second sub-string, the first sub-string representing the at least one destination address of the email message and the second sub-string representing a wildcard domain name whose Mail Exchange (MX) records point to a certification email address whereby the email message will be sent to the certification email server, and wherein receiving the email message sent from the sender to the at least one destination address comprises:
         receiving the email message sent from the sender to the at least one destination address according to the MX records of the wildcard domain name;
      validating an email address of the sender and verifying that said email address corresponds to a registered sender; and
      in case of a positive result in the verification that the email address of the sender is registered:
         obtaining an electronic fingerprint of the email message,
         obtaining the at least one destination address from the field of the header of the email message relating to the at least one destination address of the email message, wherein the at least one destination address is obtained by detecting and removing from the header of the email message relating to the at least one destination address of the email message the second sub-string representing the wildcard domain name,
         sending the email message to the obtained at least one destination address managed by the destination email server,
         receiving from the destination email server a confirmation of the acceptance or refusal of the email message, and
         generating a certification file comprising at least the electronic fingerprint of the email message and the confirmation of the acceptance or refusal of the email message from the destination email server; the method further comprising:
 storing in a repository data relating to the obtained electronic fingerprint of the email message and the received confirmation of the acceptance or refusal of the email message from the destination email server,
wherein generating the certification file comprises:
 obtaining data stored in the repository relating to at least the obtained electronic fingerprint of the email message and the received confirmation of the acceptance or refusal of the email message from the destination email server; and
 generating a portable document format (PDF) file from the obtained data.

2. The method according to claim 1, further comprising: storing in the repository data relating to at least one of the following parameters:
 the Internet Protocol (IP) address of the sender email server;
 the host name of the sender email server from which the email message is received;
 the sender email address obtained from the header of the email message;
 the subject of the email message obtained from the header of the email message;
 the at least one destination address that was obtained;
 a unique identifier of a certification event;
 the date and time in which the email message is received by the certification email server; and
 the date and time in which the confirmation of acceptance or refusal of the email message from the destination email server is received from the certification email server.

3. The method according to claim 1, further comprising: storing in the repository the received communication between the certification email server and the destination email server including the confirmation of the acceptance or refusal of the email message from the destination email server; and
wherein the generated certification file further comprises the stored communication.

4. The method according to claim 1, wherein obtaining the electronic fingerprint of the email message comprises:
 generating a portable document format (PDF) file from the email message; and
 obtaining the electronic fingerprint of the PDF file.

5. The method according to claim 1, wherein the email message comprises at least one attached file and the method further comprises:
 obtaining an electronic fingerprint of the attached file; and
wherein the generated certification file further comprises the electronic fingerprint of the attached file.

6. The method according to claim 1, further comprising: digitally signing the generated certification file.

7. The method according to claim 6, further comprising: timestamping the generated digitally signed certification file.

8. The method according to claim 1, further comprising: sending the generated certification file to the sender through the sender email server.

9. The method according to claim 1, further comprising: sending the generated certification file to the at least one destination address through the destination email server.

10. A certification email server for certifying that an email message sent through a sender email server from a sender to at least one destination address has been received by a destination email server managing the at least one destination address, the certification email server comprising:
 a memory and a processor, embodying instructions stored in the memory and executable by the processor, the instructions comprising functionality to:
  receiving the email message sent through the sender email server from the sender to the at least one destination address wherein the email message comprises a header and a message body and wherein the email message comprises, in a field of the header of the email message relating to the at least one destination address, a string comprising a first sub-string concatenated with a second sub-string, the first sub-string representing the at least one destination address of the email message and the second sub-string representing a wildcard domain name whose Mail Exchange (MX) records point to a certification email address whereby the email message will be sent to the certification email server, and wherein receiving the email message sent from the sender to the at least one destination address comprises:
   receiving the email message sent from the sender to the at least one destination address according to the MX records of the wildcard domain name;
   validating an email address of the sender and verifying that said email address corresponds to a registered sender; and
  in case of a positive result in the verification that the email address of the sender is registered:
   obtaining an electronic fingerprint of the email message,
   obtaining the at least one destination address from the field of the header of the email message relating to the destination address of the email message, wherein the at least one destination address is obtained by detecting and removing from the header of the email message relating to the at least one destination address of the email message the second sub-string representing a wildcard domain name,
   sending the email message to the obtained at least one destination address managed by the destination email server,
   receiving from the destination email server a confirmation of the acceptance or refusal of the email message, and
   generating a certification file comprising at least the electronic fingerprint of the email message and the confirmation of the acceptance or refusal of the email message from the destination email server; the instructions further comprising functionality to
  storing in a repository data relating to the obtained electronic fingerprint of the email message and the received confirmation of the acceptance or refusal of the email message from the destination email server,
 wherein generating the certification file comprises:
  obtaining data stored in the repository relating to at least the obtained electronic fingerprint of the email message and the received confirmation of the acceptance or refusal of the email message from the destination email server; and
  generating a portable document format (PDF) file from the obtained data.

11. The certification email server according to claim 10, wherein the electronic fingerprint comprises a cryptographic hash value.

12. A non-transitory computer-readable medium, which when executed by a computer, causes the computer to perform a method of certifying that an email message sent through a sender email server from a sender to at least one destination address has been received by a destination email server managing the at least one destination address, said method according to claim 1.

\* \* \* \* \*